No. 693,294. Patented Feb. 11, 1902.
W. H. MALLINSON.
STRAP COUPLING.
(Application filed Dec. 22, 1900.)
(No Model.)
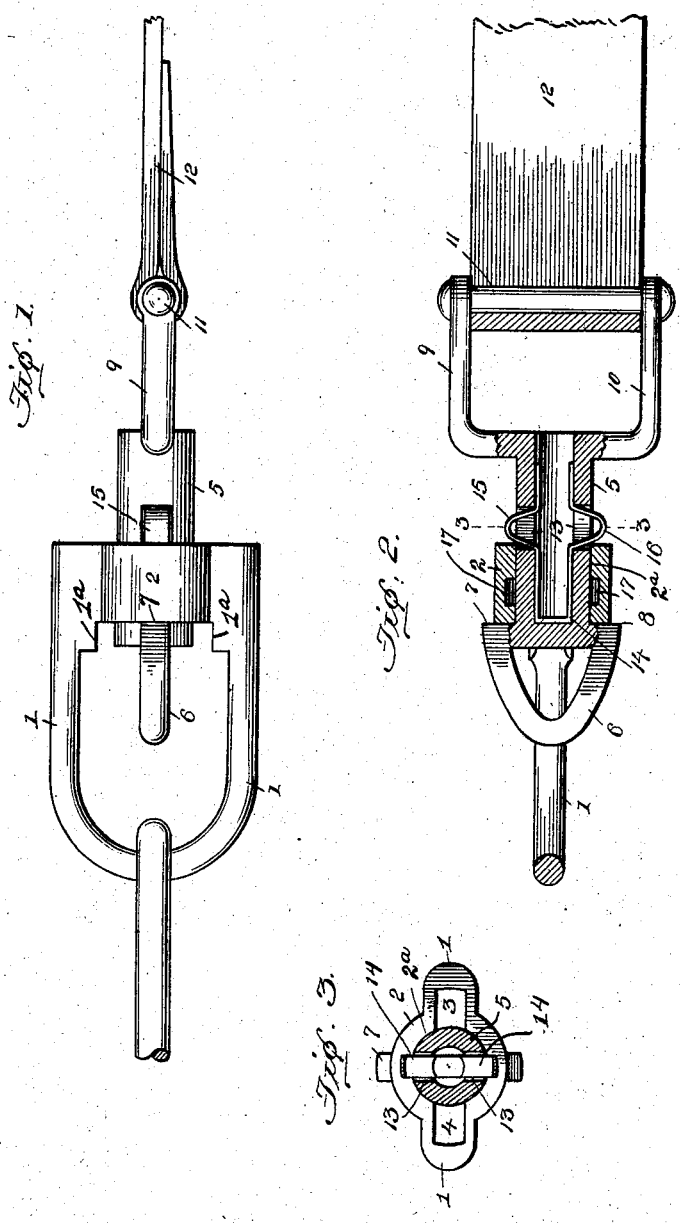
Witnesses
F. W. Riley
Harry Schmidt.
Inventor
W. H. Mallinson,
By Victor J. Evans Attorney

UNITED STATES PATENT OFFICE.

WILLIAM H. MALLINSON, OF HARLEM, NORTH DAKOTA.

STRAP-COUPLING.

SPECIFICATION forming part of Letters Patent No. 693,294, dated February 11, 1902.

Application filed December 22, 1900. Serial No. 40,816. (No model.)

*To all whom it may concern:*

Be it known that I, WILLIAM H. MALLINSON, a citizen of the United States, residing at Harlem, in the county of Sargent and State of North Dakota, have invented certain new and useful Improvements in Strap-Couplings; and I do hereby declare the following to be a full, clear, and exact description of the invention, such as will enable others skilled in the art to which it appertains to make and use the same.

My invention relates to strap-couplings; and its object is to provide a device of this character of simple and inexpensive construction which may be readily manipulated to attach or detach the parts of a strap.

The construction of the improvement will be fully described hereinafter in connection with the accompanying drawings, which form a part of this specification, and its novel features will be defined in the appended claims.

In the drawings, Figure 1 is a top plan view of the invention. Fig. 2 is a side elevation of the same, partly in section; and Fig. 3 is a transverse section on the line 3 3 of Fig. 2.

The reference-numeral 1 designates a link formed at one end with a socket 2, with a central aperture $2^a$, and with diametrically opposite side recesses 3 and 4, extending through the shoulders $1^a$ on the inner side of the socket 2.

5 designates a hollow cylinder constituting the shank of the fastening and provided at one end with a projecting head 6, having shoulders 7 and 8, and at its opposite end with projecting offset parallel arms 9 and 10, formed with registering openings at their outer ends to receive a pin 11, to which is secured the end of a strap 12.

The shank 5 is formed at diametrically opposite points with radial openings 13 in line with the shoulders of the head, and within said shank is arranged a spring 14, bent to the form shown in Fig. 2 and having the bends 15 and 16 projecting through the openings 13 of the shank, so as to engage the ends of the socket when in operative position and hold head 6 to its seat.

The central aperture $2^a$ of the socket 2 is formed with the segmental recesses 17, adapted to receive the bends 15 and 16 of the spring 14 when the shank is projected through the socket 2 into the link in position to be turned therein.

To attach the shank to the link, the head of said shank is inserted through the socket, the side recesses 3 and 4 permitting the head 6, with its shoulders 7 and 8, to pass through the socket beyond the shoulders $1^a$ of the sides of the link. After the insertion of the shank it is given a partial turn, the segmental recesses 17 receiving the projecting portions 15 and 16 of the spring. When the parts are in this position, a pull upon the pin 11 brings the bends 15 and 16 of the spring outward, permitting the shank 5 to be moved longitudinally until the shoulders 7 and 8 contact with the adjacent inner edges of the socket 2, which edges receive the strains of the pull or draft.

The bends spring on the outer face of the socket, and the head is prevented from assuming a position in line with the side recesses 3 and 4 by the shoulders $1^a$, between which the head 6 is seated.

To disconnect the parts, it is only necessary to push the shank inward until the portions 15 and 16 of the spring reach the inner recesses 17, after which the shank may be turned until the projecting shoulders 7 and 8 of the edge of the shank, as well as the bends 15 and 16 of the spring, are in alinement with the recesses 3 and 4 of the socket, when the shank may be readily drawn out and disconnected.

The improvement constructed as above described provides a secure attachment for the traces of harness, and one which may be quickly manipulated to attach or detach traces.

Having thus described my invention, the following is what I claim as new therein and desire to secure by Letters Patent:

1. A strap-coupling comprising a link formed with a socket having a central aperture and side recesses, a hollow shank formed with diametrically opposite radial openings, a head on said shank having shoulders adapted to pass through the side recesses, and a strap-attaching means, and a spring located within the shank and projecting through the radial openings for locking the shank and seating the head.

2. A strap-coupling comprising a link formed with a socket having a central aperture, side recesses, and shoulders on the inner side of the socket, a hollow shank formed with diametrically opposite radial openings, a head on said shank having shoulders adapted to pass through the side recesses and the shoulders of the link, a strap-attaching means, and a spring located within the shank and projecting through the radial openings, for locking the shank and seating the head between the shoulders of the link.

3. A strap-coupling comprising a link formed with a socket having a central aperture, side recesses and segmental recesses, a hollow shank formed with diametrically opposite radial openings, a head on said shank having shoulders adapted to pass through the side recesses, a strap-attaching means, and a spring located within the shank and projecting through the radial openings for locking the shank and seating the head.

In testimony whereof I affix my signature in presence of two witnesses.

WILLIAM H. MALLINSON.

Witnesses:
L. H. WHITE,
J. J. WHITE.